(No Model.)
A. HARPOLD.
TREE BALLER AND TRANSPLANTER.
No. 442,184. Patented Dec. 9, 1890.
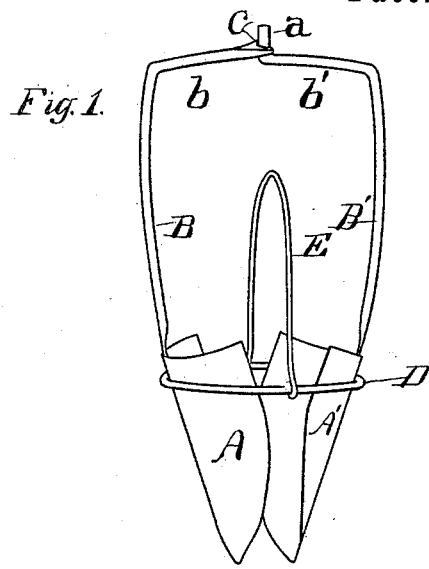
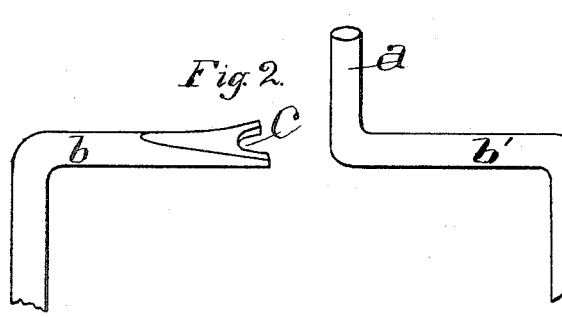
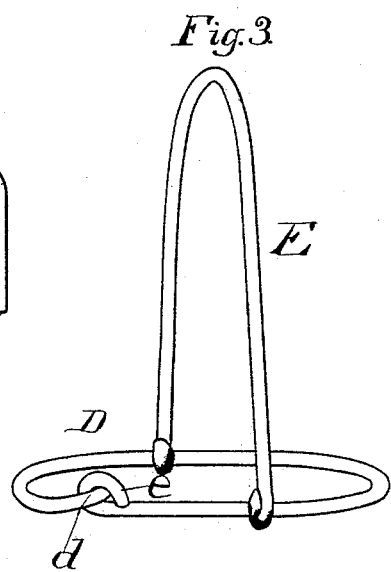
Witnesses
M. C. Galer.
Alfred I. Townsend
Inventor
Adam Harpold
by Hazard Townsend
his attys.

UNITED STATES PATENT OFFICE.

ADAM HARPOLD, OF COLTON, CALIFORNIA.

TREE BALLER AND TRANSPLANTER.

SPECIFICATION forming part of Letters Patent No. 442,184, dated December 9, 1890.

Application filed June 18, 1890. Serial No. 355,880. (No model.)

*To all whom it may concern:*

Be it known that I, ADAM HARPOLD, a citizen of the United States, residing at Colton, in the county of San Bernardino and State of California, have invented a new and useful Tree Baller and Transplanter, of which the following is a specification.

The object of my invention is to provide simple and efficient means whereby living trees, shrubs, and other plants can be conveniently and at slight expense and labor removed from place to place and balled, if required, without injury to such plant.

My tree baller and transplanter consists of two approximately semi-cylindrical triangular blades mounted, respectively, upon complementary handles, each bent at its upper end to form an arm projecting across the plane of the face of its blade, and provided at its extremity with an engaging device arranged to engage with the engaging device on the other arm, and a band arranged to encircle the blades and provided with a bail.

The accompanying drawings illustrate my invention.

Figure 1 is a perspective view of my invention with the several parts in the relative position they occupy when in use. Fig. 2 is a view of the arms of the complementary handles. Fig. 3 is a view of the band and bail.

A A' are the triangular semi-cylindrical blades.

B B' are the complementary handles, the upper ends of which are bent to form the radial arms $b$ $b'$, which are provided at their ends with complementary engaging devices, such as the axial stem $a$ on one of the arms and the socket $c$ on the other arm. The complementary engaging devices at the ends of the radial arms are designed to hold the upper ends of the handles from being unduly pressed toward the tree when the implement is in use.

D is the band, which is adjustable—that is to say, it is divided so that its ends can be spread apart, and its ends are arranged for connection with each other, so that when connected the band cannot be spread. The band is preferably made of a single length of suitable wire bent into annular form, and provided at one end with a hook $d$ and at the other end with an eye $e$, or for some plants a solid ring or band may be used.

E is the bail, secured to the band D at two points, which will be opposite each other when the ends of the band are connected, as shown in Fig. 3.

In practice the band is laid upon the earth surrounding the tree or other plant to be moved, and the ends of the band are then connected. The blades are then separately inserted into the earth on opposite sides of such tree or other plant within the band and at such distance from the plant that the roots will not be damaged, holding the stem of one handle and the socket of the other as nearly as possible vertically over the summit of the bail. The inclination of the blades with the handles thus held will direct the points of the blades underneath the plant, and the stem and socket will engage, or nearly so. The blades while being inserted into the ground are given an inclination to direct their points underneath the plant. The blades are sufficiently long to allow a portion of the top of the blades to project above the ground when the points are below the roots. When the blades are thus inserted, the band is drawn up by means of the bail, thus pressing together the complementary devices on the ends of the arms $b$ $b'$ and securely binding the blades and the earth between them, and the tree or plant can be removed without disturbing the earth about the roots. If it is desired to ball the plant for transportation, lay the balling-cloth over the hole from which the plant has been removed as above and drop the device back into position as before removing. Then remove the parts of the device in the reverse order and tie or sew up the balling-cloth.

The bail E forms a convenient handle by which to lift the plant.

The stem $a$ may be made of any length desired, thereby avoiding the necessity of accurately setting the two blades at exactly the same depth to enable the socket to engage the stem. It is well, however, to set both blades as near to the same depth and angle as convenient.

A degree of utility can be secured by blades of different form from that shown; but I believe the form shown to be preferable. The semi-cylindrical form of the blades assists in binding the earth and the triangular or pointed form allows them to assume the form of an inverted cone to lift the earth more efficiently.

Now, having described my invention, what I claim as new, and desire to secure by Letters Patent, is—

1. The tree baller and transplanter consisting of two blades mounted, respectively, upon complementary handles, each bent at its upper end to form an arm projecting across the plane of the face of its blade to engage the other arm, and a band arranged to encircle the blades.

2. A tree baller and transplanter consisting of two approximately semi-cylindrical triangular blades mounted, respectively, upon complementary handles, each bent at its upper end to form an arm projecting across the plane of the face of its blade and provided at its extremity with an engaging device, and a band arranged to encircle the blades and provided with a bail.

3. A tree baller and transplanter consisting of two blades provided, respectively, each with a handle, bent at its upper end to form an arm projecting across the plane of the face of the blade, one of such arms being provided at its extremity with a stem and the other arm being provided at its extremity with a socket for such stem, and the band arranged to encircle such blades and provided with a bail.

ADAM HARPOLD.

Witnesses:
JAMES R. TOWNSEND,
L. M. SPRECHER.